United States Patent
Hedlund et al.

(10) Patent No.: US 10,210,376 B2
(45) Date of Patent: Feb. 19, 2019

(54) METHOD FOR DETERMINING AN IN-FOCUS POSITION AND A VISION INSPECTION SYSTEM

(75) Inventors: Sven Hedlund, Genarp (SE); Oscar Beijbom, Lund (SE); Martin Almers, Lund (SE)

(73) Assignee: CellaVision AB, Lund (SE)

( * ) Notice: Subject to any disclaimer, the term of this patent is extended or adjusted under 35 U.S.C. 154(b) by 1205 days.

(21) Appl. No.: 12/449,873

(22) PCT Filed: Feb. 19, 2008

(86) PCT No.: PCT/JP2008/051993
§ 371 (c)(1),
(2), (4) Date: Nov. 19, 2009

(87) PCT Pub. No.: WO2008/107303
PCT Pub. Date: Sep. 12, 2008

(65) Prior Publication Data
US 2010/0177187 A1    Jul. 15, 2010

Related U.S. Application Data

(60) Provisional application No. 60/905,601, filed on Mar. 8, 2007.

(30) Foreign Application Priority Data

Mar. 8, 2007   (EP) .................................... 07103773

(51) Int. Cl.
*H04N 7/18* (2006.01)
*G06K 9/00* (2006.01)
(Continued)

(52) U.S. Cl.
CPC ......... *G06K 9/00134* (2013.01); *G03B 13/32* (2013.01); *G06T 7/11* (2017.01); *G06T 7/90* (2017.01); *G06T 2207/30024* (2013.01)

(58) Field of Classification Search
CPC ...... H04N 5/23212; G06K 9/46; G03B 13/32; G02B 21/244
(Continued)

(56) References Cited

U.S. PATENT DOCUMENTS 5,544,256 A * 8/1996 Brecher et al. ............... 382/149
5,548,661 A * 8/1996 Price .................... G01N 15/147
                                                                348/80
(Continued)

FOREIGN PATENT DOCUMENTS

EP     1326209       7/2003
JP     4-116512      4/1992
(Continued)

OTHER PUBLICATIONS

Oscar Beijbom, Single image focus level assessment using Support Vector Machines, Jan. 30, 2007.*
(Continued)

*Primary Examiner* — Richard T Torrente
(74) *Attorney, Agent, or Firm* — Harness, Dickey & Pierce, P.L.C.

(57) ABSTRACT

In one embodiment of the present invention, a method is disclosed for determining a difference between a sample position and an in-focus position, as well as a vision inspection system. In a first step image data depicting a sample is captured. Next, a feature set is extracted from the image data. Thereafter, the feature set is classified into a position difference value, corresponding to the difference between the sample position and the in-focus position, by using a machine learning algorithm that is trained to associate image data features to a position difference value.

27 Claims, 7 Drawing Sheets

(51) Int. Cl.
*G03B 13/32* (2006.01)
*G06T 7/11* (2017.01)
*G06T 7/90* (2017.01)

(58) Field of Classification Search
USPC .................................. 348/79; 382/159, 134
See application file for complete search history.

(56) References Cited

U.S. PATENT DOCUMENTS

| | | | | |
|---|---|---|---|---|
| 5,790,710 | A * | 8/1998 | Price et al. | 382/255 |
| 5,933,519 | A * | 8/1999 | Lee et al. | 382/133 |
| 6,005,974 | A * | 12/1999 | Kochi et al. | 382/190 |
| 6,753,919 | B1 | 6/2004 | Daugman | |
| 7,034,883 | B1 * | 4/2006 | Rosenqvist | 348/345 |
| 7,117,186 | B2 * | 10/2006 | Koza et al. | 706/13 |
| 7,324,151 | B2 * | 1/2008 | Onozawa | H04N 5/23212 348/333.02 |
| 2003/0197925 | A1 * | 10/2003 | Hamborg | G02B 21/244 359/383 |
| 2005/0129331 | A1 | 6/2005 | Kakiuchi et al. | |
| 2006/0204121 | A1 * | 9/2006 | Bryll | G06K 9/6288 382/255 |
| 2007/0069106 | A1 * | 3/2007 | Krief | G02B 21/244 250/201.3 |
| 2008/0240528 | A1 * | 10/2008 | Tumpner | G02B 21/244 382/128 |
| 2009/0010373 | A1 * | 1/2009 | Jestice | G01T 3/00 376/153 |

FOREIGN PATENT DOCUMENTS

| | | |
|---|---|---|
| JP | 7-107363 | 4/1995 |
| JP | 2000-338385 | 12/2000 |
| JP | 2003-199115 | 7/2003 |
| JP | 2004-070139 | 3/2004 |
| JP | 2004-304822 | 10/2004 |
| JP | 2005-158033 | 6/2005 |
| JP | 2006-039658 | 2/2006 |
| JP | 2007-531060 | 11/2007 |
| WO | WO 00/33569 | 6/2000 |
| WO | WO 2005/094304 | 10/2005 |

OTHER PUBLICATIONS

Volker Hilsenstein et al., "Robust Autofocusing for Automated Microscopy Imaging of Fluorescently Labelled Bacteria", Digital Image Computing: Techniques and Applications, 2005, DICTA '05, Proceedings 2005, Issue Date: Dec. 6-8, 2005, 15 pages.*
Brázdilová, Silvie Luisa. "Autofocusing in Automated Microscopy." RNDr thesis, Faculty of Informatics, Masaryk University, Czech Republic (2006).*
Japanese Office Action dated Jul. 1, 2011 issued in Japanese Application No. 2009-552156.
Japanese Office Action dated Apr. 20, 2012 issued in Japanese Application No. 2009-552156.
European Office Action dated Jun. 13, 2012 issued in European Application No. 07103773.3.
European Office Action dated Feb. 7, 2013, issued in Application No. 07 103 773.3.

* cited by examiner

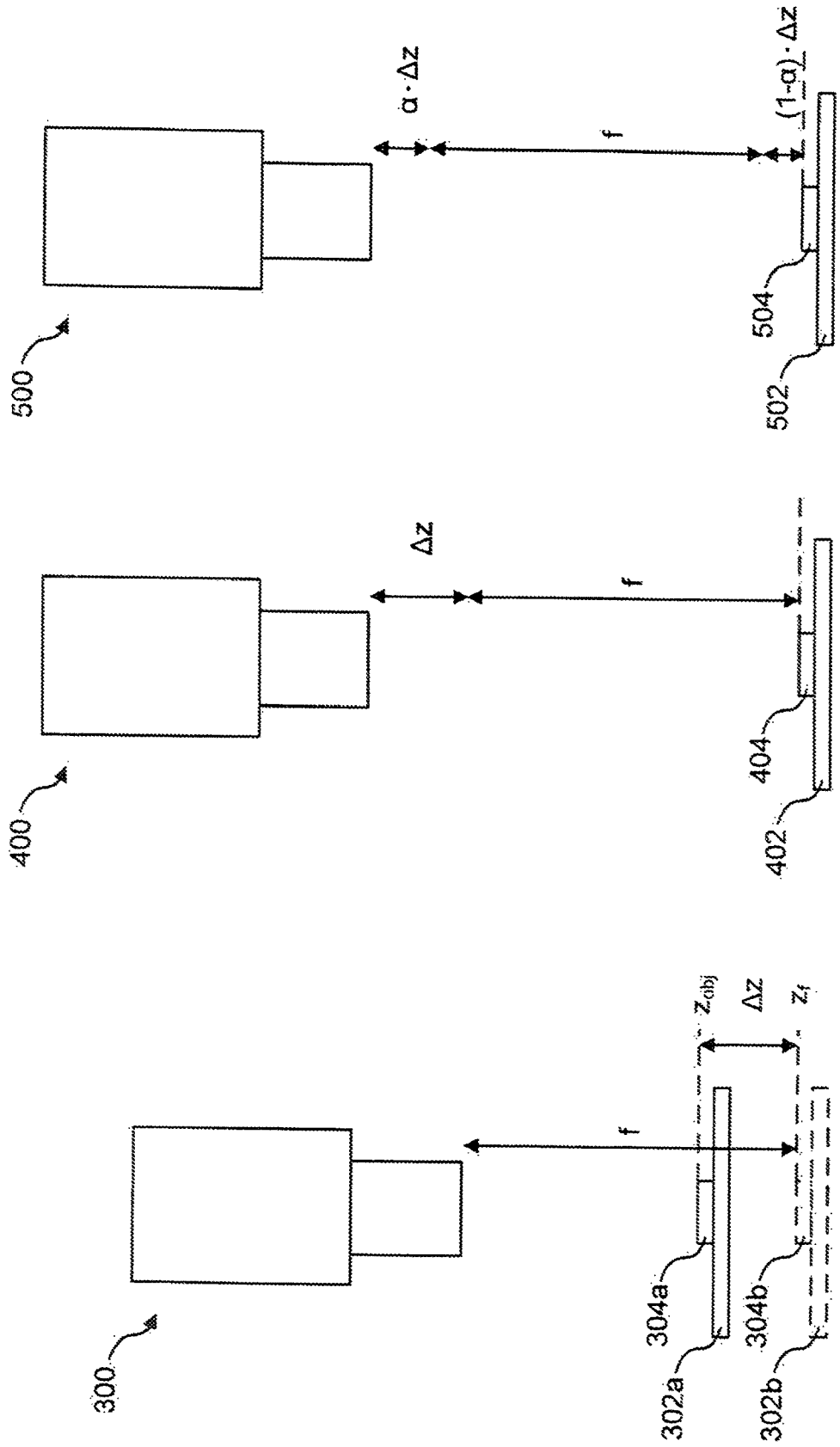

METHOD FOR DETERMINING AN IN-FOCUS POSITION AND A VISION INSPECTION SYSTEM

CROSS-REFERENCE TO RELATED APPLICATIONS

This application is a National Phase entry of PCT Application number PCT/EP2008/051993 filed on Feb. 19, 2008, which claims priority under 35 U.S.C. § 119 to EP 07103773.3 filed on Mar. 8, 2007 and which claims priority under 35 U.S.C. § 119(e), 120 and 365(c) to U.S. Provisional Application No. 60/905,601, filed on Mar. 8, 2007.

TECHNICAL FIELD

The present invention generally relates to a method for determining a difference between a sample position and an in-focus position, a vision inspection system and a control device.

BACKGROUND OF THE INVENTION

Computer-aided image analysis of biological material has become popular during the last years. For instance, computer-aided processes for counting and classifying white blood cells in a blood smear have been developed. These types of tests are e.g. an important step in the process of determining whether a patient suffers from an infection, allergy or blood cancer.

In order to be able to make a reliable analysis it is of great importance that the image data is of proper quality, involving for instance that the image data is sharp, i.e. captured with accurate focus settings.

Today, a common method for finding an in-focus position involves a first step of capturing several images at different positions, a second step of identifying high frequency components in the captured images and a third step of determining the image with the highest amount of high frequency components. The position corresponding to the image with the highest amount of high frequency components is thereafter chosen to be the in-focus position. In order to find the in-focus position it is not unlikely that as much as 20 images at different positions have to be captured.

Moreover, if image data is to be captured for each of the objects to be classified, the image capturing process must be repeated a number of times, e.g. 20 times, for every object, which in turn implies that a large amount of image data has to be captured for every sample and that the vision inspection system must be readjusted a large number of times for every sample. Hence, this method consumes a lot of time and the large amount of readjustments may wear out the system.

SUMMARY

In view of the above, an objective of the invention is to solve or at least reduce the problems discussed above. In particular, an objective is to provide a method for determining a difference between a sample position and an in-focus position based upon image data. This implies that fewer images have to be captured in order to determine an in-focus position, and in many cases only one image is needed. By reducing the number of images the processing time will be reduced as well as the risk of wearing out the steering motor system.

The above object is provided according to a first aspect by a method for determining a difference between a sample position and an in-focus position, said method comprising
capturing image data depicting a sample,
extracting a feature set from said captured image data, and
classifying, by using a machine learning algorithm that is trained to associate image data features to a position difference value, said feature set into said position difference value, wherein said position difference value corresponds to said difference.

Optionally, said feature set may comprise a sub-set of contrast features.

Optionally, said sub-set of contrast features may be selected from a group consisting of a squared gradient function based upon said image data, a wavelet function based upon said image data and an auto-correlation function, such as Vollath's $F_4$ function or a combination of Vollath's $F_4$ function and Vollath's $F_5$ function, based upon said image data, a variance for the whole image data and a Laplace-based focus measure.

Optionally, said contrast features may be determined for a plurality of color layers.

Optionally, said contrast features may be determined for a sub-set of said image data.

Optionally, said feature set may comprise a sub-set of directional features.

Optionally, a number of features of said sub-set of directional features may be determined by identifying differences between a plurality of color layers and determining at least one feature value based upon said determined differences.

Optionally, a number of features of said sub-set of directional features may be determined by identifying a number of different objects having different heights in said sample, determining differences for said different objects, and determining at least one feature value based upon said determined differences for said different objects.

Optionally, said sub-set of directional features may comprise a quotient between different Laplace-based focus measures according to the formula $$\frac{F_{A_{m,c1}}(R) \cdot F_{A_{q,c2}}(R)}{F_{A_{n,c1}}(R) \cdot F_{A_{p,c2}}(R)}$$

Optionally, said directional features may be determined for a sub-set of said image data.

Optionally, said feature set may comprise a sub-set of content features.

Optionally, said sub-set of content features may comprise overall content features and segmental content features.

Optionally, said overall content features may be selected from a group consisting of mean intensity for the whole image data and variance for the whole image data.

Optionally, said overall content features may be determined for a plurality of color layers.

Optionally, the method may further comprise
determining foreground and background segments in said image data.

Optionally, the method may further comprise
segmenting said foreground segments into segments of object classes.

Optionally, the method may further comprise
determining a number of objects in at least one of said object classes.

Optionally, the method may further comprise determining a number of pixels belonging to the objects of an object class for at least one of said object classes.

Optionally, said segmental content features may be selected from a group consisting of mean intensity for foreground segments, mean intensity for background segments, variance for foreground segments, variance for background segments and an area function expressing an area distribution between different segments.

Optionally, said segmental content features may be selected from a group consisting of mean intensity for at least one of said object classes, variance for at least one of said object classes and an area function expressing an area distribution between different object classes.

Optionally, at least one of said object classes may be selected from a group consisting of a red blood cell (RBC) object class and a white blood cell (WBC) object class.

Optionally, said foreground and background segments may be determined for a plurality of color layers.

The area function may for instance be a function that expresses the relationship between foreground segments and background segments, such as a number of foreground segments pixels divided by a number of background segment pixels.

The main purpose of the content features is to compensate for variations in the image that do not influence the degree/level of focus, but still influence the contrast features and directional features.

Optionally, said step of classifying said feature set into a position difference value may be performed by a support vector machine.

The above object is provided according to a second aspect by a vision inspection system comprising a slide holder adapted to hold at least one slide comprising a sample, an image capturing device configured to capture image data depicting said sample, wherein said image capturing device comprises an optical system and an image sensor, a steering motor system configured to alter a distance between said sample and said optical system, a processor connected to said image capturing device and said steering motor system, wherein said processor, in association with a memory, is configured to determine a difference between a sample position and an in-focus position by receiving said image data depicting said sample from said image capturing device, extracting a feature set from said image data, classifying, by using a machine learning algorithm that is trained to associate image data features to a position difference value, said feature set into said position difference value, wherein said position difference value corresponds to said difference and instructing said steering motor system to alter said distance between said sample and said optical system in accordance to said determined difference.

Optionally, said feature set may comprise a sub-set of contrast features.

Optionally, said sub-set of contrast features may be selected from a group consisting of a squared gradient function based upon said image data, a wavelet function based upon said image data and an auto-correlation function, such as Vollath's $F_4$ function or a combination of Vollath's $F_4$ function and Vollath's $F_5$ function, based upon said image data, a variance for the whole image data and a Laplace-based focus measure.

Optionally, said feature set may comprise a sub-set of directional features.

Optionally, a number of features of said sub-set of directional features may be determined by identifying differences between a plurality of color layers and determining at least one feature value based upon said determined differences.

Optionally, said sub-set of directional features may comprise a quotient between different Laplace-based focus measures according to the formula $$\frac{F_{A_{m,c1}}(R) \cdot F_{A_{q,c2}}(R)}{F_{A_{n,c1}}(R) \cdot F_{A_{p,c2}}(R)}$$

Optionally, said feature set may comprise a sub-set of content features.

Optionally, said features may be determined for a plurality of color layers.

Optionally, said features may be determined for a sub-set of said image data.

Optionally, said step of classifying said feature set into a position difference value may be performed by a support vector machine.

The options of the first aspect are also applicable for this second aspect.

The above object is provided according to a third aspect by a control device comprising a receiver configured to receive image data depicting said sample, a processor, in association with a memory, configured to determine a difference between a sample position and an in-focus position by extracting a feature set from said image data, classifying, by using a machine learning algorithm that is trained to associate image data features to a position difference value, said feature set into said position difference value, wherein said position difference value corresponds to said difference and a transmitter configured to transmit said determined difference.

The options of the first aspect are also applicable to this third aspect.

The above object is provided according to a fourth aspect by a computer program comprising software instructions arranged to be perform the method as described above when downloaded and run in an apparatus.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein:

FIG. 3 illustrates an example of a negatively defocused vision inspection system.

FIG. 4 illustrates an example of a positively defocused vision inspection system.

FIG. 5 illustrates another example of a positively defocused vision inspection system.

DETAILED DESCRIPTION OF PREFERRED EMBODIMENTS

Figure 1:
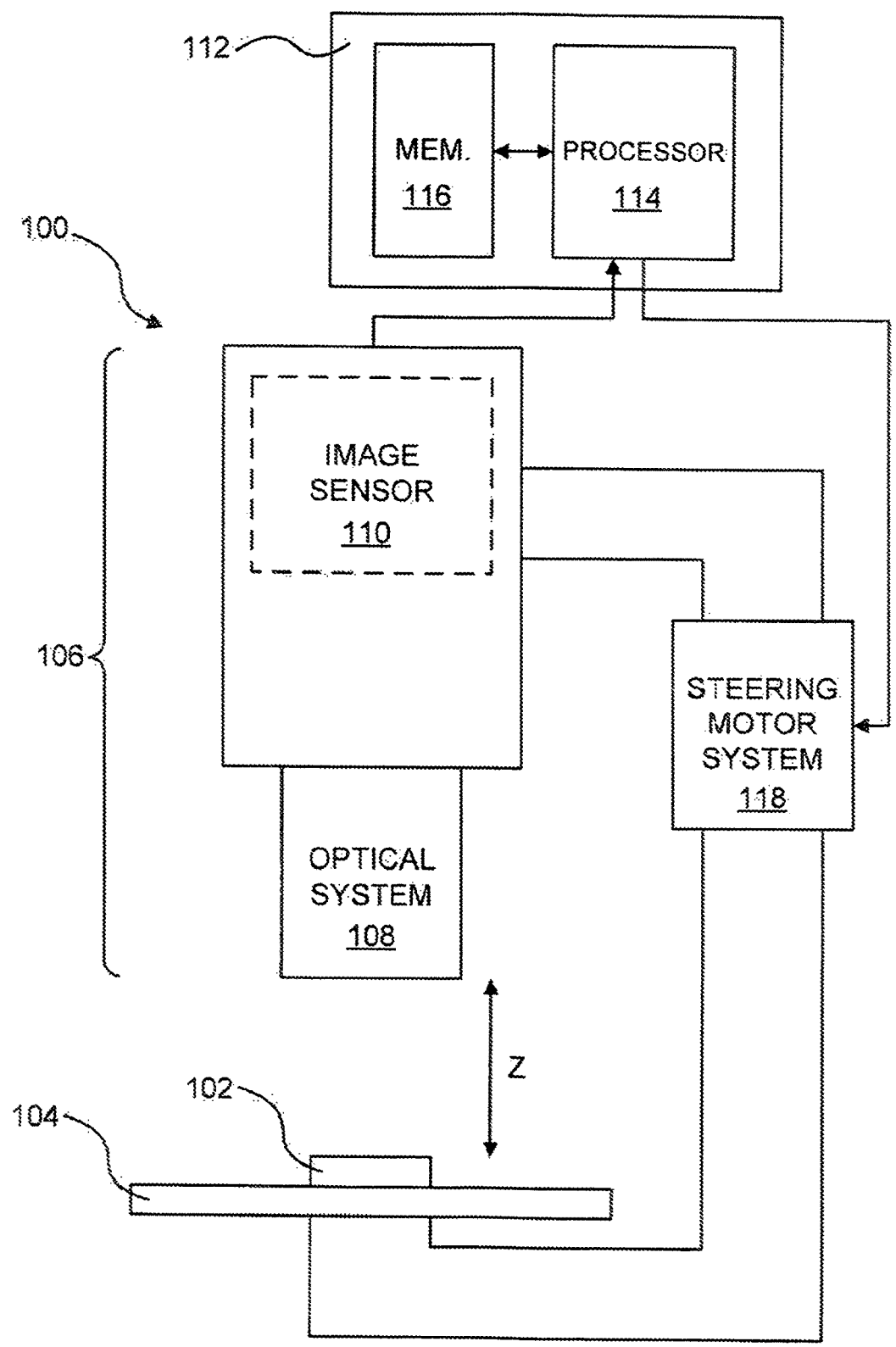
FIG. 1 diagrammatically illustrates a vision inspection system.

FIG. 1 generally illustrates a vision inspection system 100. A slide 102 comprising a sample, such as a blood sample, is placed in a slide holder 104. The slide holder 104 may be adapted to hold a number of slides or only one, as illustrated in FIG. 1. An image capturing device 106, comprising an optical system 108 and an image sensor 110, is adapted to capture image data depicting the sample in the slide 102. Further, in order to control the light environment, and hence get image data which is easier to analyze, a light emitting device (not shown) may be used.

The image data captured by the image capturing device 106 can be transferred to an image processing device 112. The image processing device 112 may be an external apparatus, such as a personal computer, connected to the image capturing device 106. Alternatively, the image processing device 112 may be incorporated in the image capturing device 106.

The image processing device 112 can comprise a processor 114, associated with a memory 116, configured to determine a difference between a sample position and an in-focus position. This process is further illustrated in FIG. 8.

When the difference is determined an instruction can be transferred to a steering motor system 118. The steering motor system 118 can, based upon the instruction from the image processing device 112, alter the distance z between the slide 102 and the optical system 108.

Figure 2:
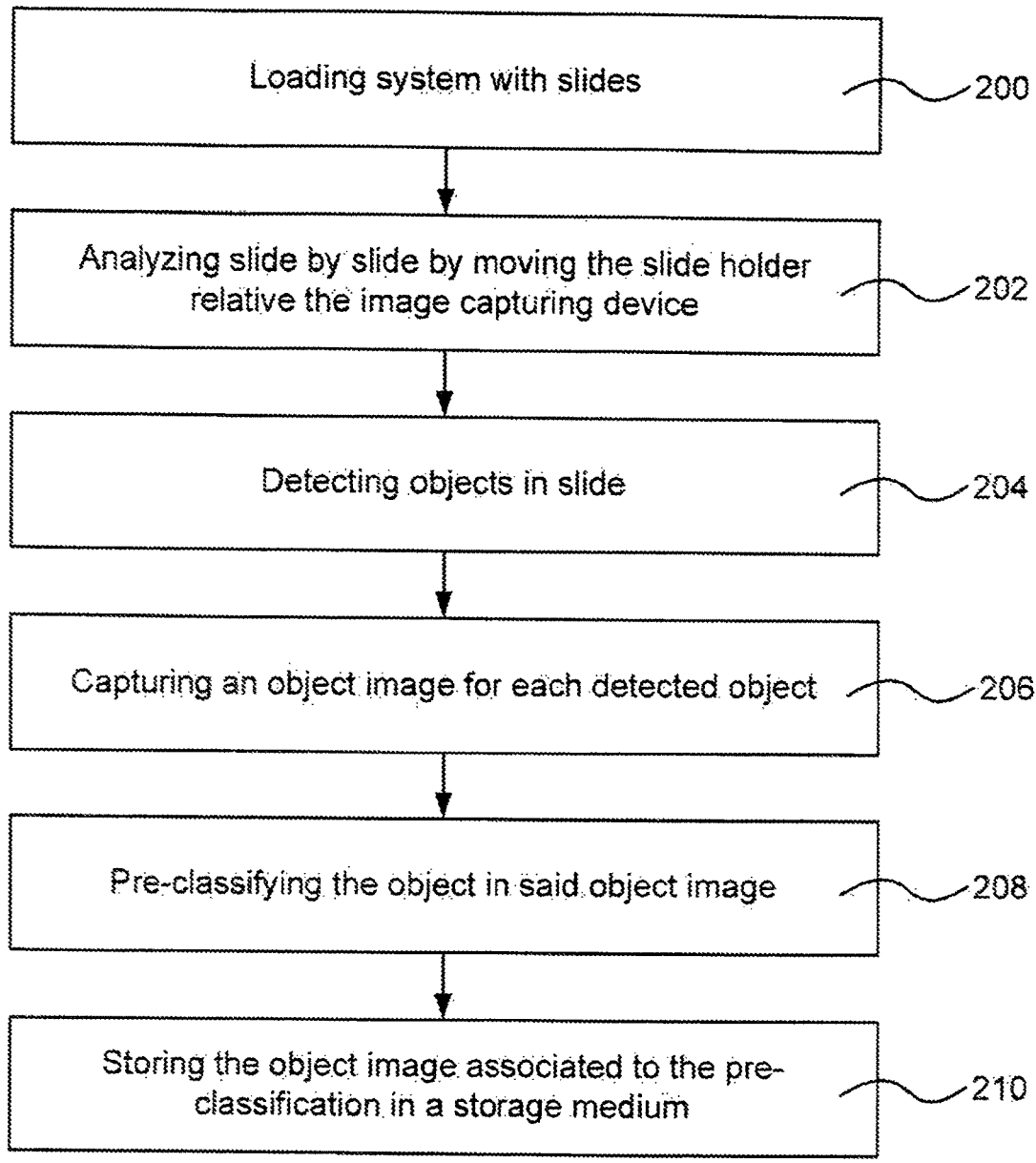
FIG. 2 illustrates a flowchart of a general method for inspecting samples using the vision inspection system.

A method for inspecting samples by using the vision inspection system is generally illustrated in FIG. 2.

In a first step 200, the vision inspection system can be loaded with one or several slides. Each slide holds a sample. A sample may be, but is not restricted to, a biological specimen.

Next, in a step 202, a first slide of the one or several slides is analyzed. This can be performed by moving the slide holder such that the first slide is in the field of view of the image capturing device. Alternatively, the image capturing device can be moved such that the first slide is in the field of view of the image capturing device.

In a third step 204, a number of objects, such as white blood cells, to be analysed in further detail is recognized. In order to be able to perform an analysis in further detail the position of the objects can be stored.

In a fourth step 206, object image data is captured for each detected object. In order to capture object image data for each detected object, the slide holder can be moved in accordance to the stored positions. Alternatively, instead of moving the slide holder, the image capturing device may be moved in accordance to the stored positions.

In a fifth step 208, the object image data can be pre-classified into a pre-determined classification. For instance, if the objects are white blood cells, this step may comprise classifying the white blood cells into a specific type of white blood cells.

In a sixth step 210, the object image data and associated pre-classifications can be stored. Thus, it is possible for the operator of the vision inspection system to investigate image data depicting the objects for each sample together with associated pre-classifications.

If the vision inspection system is loaded with more than one slide, the second step 202 to the sixth step 210 can be repeated for the other slides of the vision inspection system.

Moreover, in step 204, a slide overall image may be captured. The magnification of the image capturing device, when capturing the slide overall image, may be 10×, i.e. ten times enlargement, and when capturing object image data the magnification of the image capturing device may be switched to 100×, i.e. hundreds times enlargement. The magnification may vary for different systems, but generally the magnification of the image capturing device is increased when switching from capturing the slide overall image to capturing the object image data.

In the above mentioned step 204 and 206 of FIG. 2, the optical system can be moved in order to capture image data depicting each of the detected objects in the sample. In order to improve the possibility of making a correct pre-classification of the object, the slide is to be placed in an in-focus position, which means that the distance z between the slide and the optical system is to be equal to, or at least close to, the focal distance f. If the distance z is greater than the focal distance f, the system may be said to be positively defocused, and vice versa, if the distance z is less than the focal distance f, the system may be said to be negatively defocused.

If the sample, for instance, is a blood sample, the sample may be smeared onto the slide. This may imply that the sample is not fully plain, which in turn implies that the difference between the distance z and the focal distance f is to be determined each time new object image data is to be captured.

Moreover, the steering motor system may be slightly misaligned, which in turn implies that the difference between the distance z and the focal distance f is to be determined each time new object image data is to be captured.

Further, other factors interfering with the vision inspection system, such as machine induced vibrations, may result in that the difference between the distance z and the focal distance f is preferable to be determined each time new object image data is to be captured.

FIG. 3 illustrates an example of a negatively defocused system. In this example, an image capturing device 300 is fixed and a slide holder 302a/302b, holding a slide 304a/304b comprising a sample, is adapted to be altered in a vertical direction.

In a first position, the slide 304a, placed on the slide holder 302a, is positioned in a position $z_{obj}$. In this position the system is negatively defocused, which means that the object image data will be perceived as blurry by the operator of the vision inspection system.

By analysing the image data captured in this first position, a difference $\Delta z$ may be found. Then, by moving the slide holder in accordance to this determined difference $\Delta z$ a new position $z_f$ will be reached. In this new position $z_f$, the distance z between the optical system and the slide 304b is equal, or close, to the focal distance f of the vision inspection system. Hence, the object image data captured in this position will be perceived as sharp by the operator.

In contrast to the vision inspection system illustrated in FIG. 3, the vision inspection system may be, as illustrated in FIG. 4, positively defocused, i.e. the distance between an optical system of an image capturing device 400 and a slide 404 placed on a slide holder 402 is greater than the focal distance of the vision inspection system.

By capturing image data and determining a difference $\Delta z$ based upon this captured image data, the vision inspection system may be changed in such a way that the distance z is equal, or close, to the focal distance f of the vision inspection system. This may e.g. be achieved by moving the image capturing device 400 a distance, corresponding to the determined difference $\Delta z$, closer to the slide 404.

Another possibility to change a positively defocused vision inspection system such that the distance z is equal, or close, to the focal distance f is illustrated in FIG. 5.

The vision inspection system comprises an image capturing device 500 and a slide 504 placed on a slide holder 502. In order to compensate the vision inspection system in accordance to the determined difference $\Delta z$ a combination of the methods illustrated in FIG. 3 and FIG. 4 may be utilised. As illustrated FIG. 3, the slide 504 and the slide holder 502 are moved towards the image capturing device 500 and, as illustrated in FIG. 4, the image capturing device 500 is moved towards the slide 504 and the slide holder 502. The slide 504 and the slide holder 502 are moved a distance $(1-\alpha)\Delta z$, where $0 \leq \alpha \leq 1$, towards the image capturing device 500 and the image capturing device is moved a distance $\alpha \Delta z$, where $0 \leq \alpha \leq 1$, towards the slide 502 and the slide holder 504.

In one embodiment of the vision inspection system the focal distance f is approximately 100 μm and if the difference |z−f| is greater than 0.5 μm the image data will be perceived as blurry, where z is the distance between the optical system and the sample and f is the focal distance. The above mentioned distances may vary in other embodiments.

Figure 6:
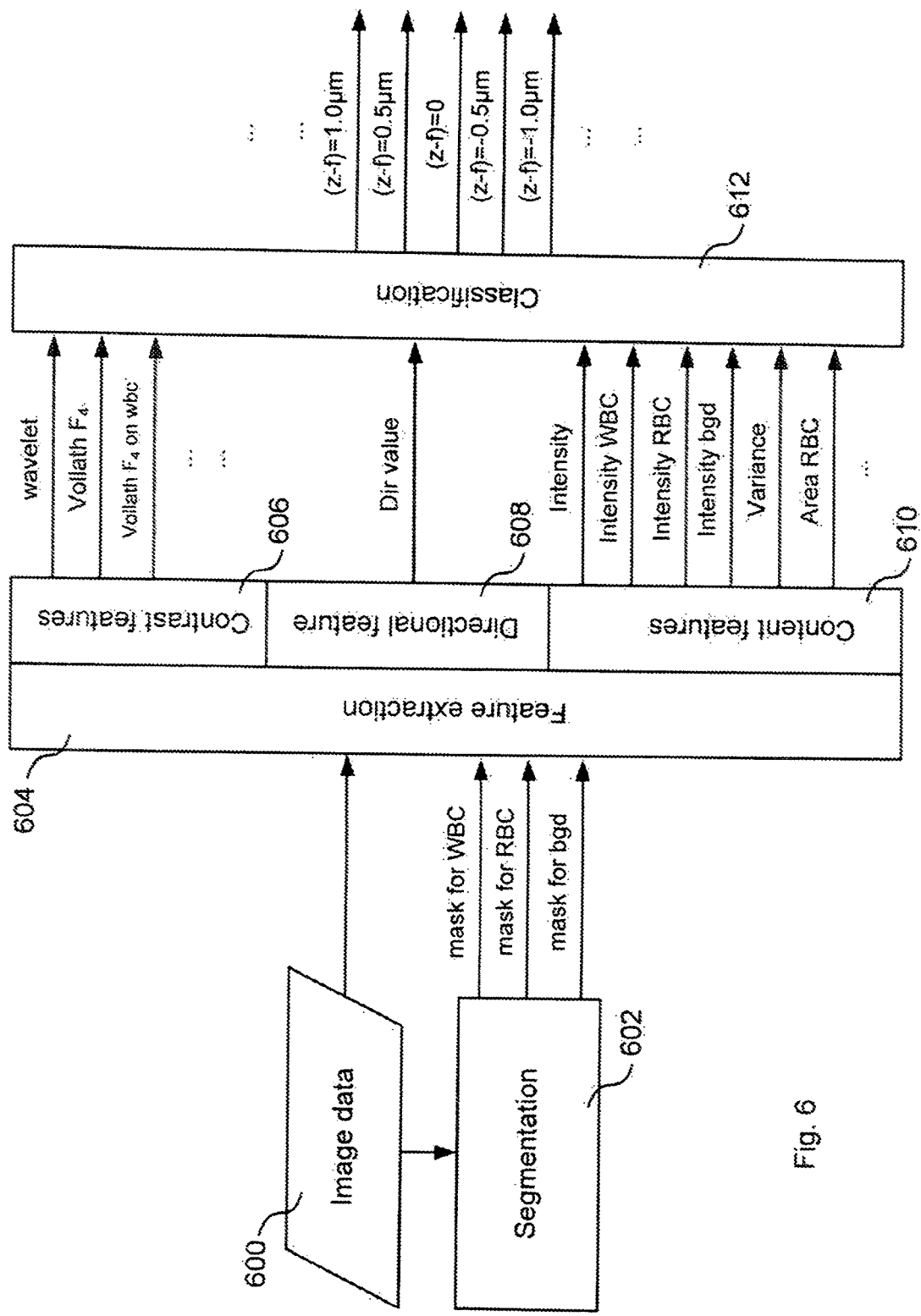
FIG. 6 illustrates a general overview of a method for determining a difference between a sample position and an in-focus position.

An overview of a method for determining a difference between a sample position and an in-focus position is illustrated in FIG. 6. In this overview, image data 600 is assumed to consist of background and foreground. The foreground may comprise red blood cells (RBC) and white blood cells (WBC). It will be appreciated by the skilled man in the art that the system may be changed such that other objects, instead of WBCs and RBCs, may be identified.

Image data 600 captured by the image capturing device is transferred to a segmentation module 602 and to a feature extraction module 604.

The segmentation module 602 identifies a number of different objects, in this case RBCs and WBCs. Thereafter, a mask for each of the identified objects can be generated and transferred to the feature extraction module 604. In this particular case, a mask for WBC, a mask for RBC and a mask for background is generated and transferred to the feature extraction module 604.

In some embodiments the nucleus of the WBC may be of particular interest. Hence, in these embodiments, a WBC nucleus mask may be used instead of, or in combination with, a WBC mask.

Further, in some embodiments, the nucleus of the WBC may be easier to identify than the entire WBC. Therefore, in these embodiments, the WBC mask may be replaced by the WBC nucleus mask. Alternatively, in these embodiments, both the WBC mask and the WBC nucleus mask may be used.

Moreover, in some embodiments, a part of the nucleus is of particular interest, or is easier to identify. In these embodiments a WBC nucleus part mask may be utilised.

Based on the received image data 600 and the masks transferred from the segmentation module 602, the feature extraction module 604 can extract three categories of features.

A first category is herein referred to as contrast features 606. In brief, this category can comprise a number of features which in different ways express the amount of high frequency components in the image data 600. The content features 606 may e.g. comprise a wavelet function and a Vollath $F_4$ function. Moreover, by utilizing one of the masks generated by the segmentation module 602, features for a sub-set of the image data may be determined, e.g. by utilizing a WBC mask or a RBC mask, content features for WBC regions or RBC regions of the image data may be determined.

A second category is herein referred to as directional features 608. This category can comprise, in brief, a number of features indicating whether the system is positively defocused or negatively defocused.

A third category is herein referred to as content features 610. In brief, this category can comprise a number of features that characterizes the image data 600. The main purpose of the content features is to compensate for variations in the image that do not influence the degree/level of focus, but still influence the contrast features and directional features.

The features determined in the feature extraction module 604 can be transferred to a classification module 612. In this classification module, which e.g. may comprise a Support Vector Machine (SVM), a difference between the distance z and the focal distance f can be determined. The difference may e.g. be expressed in steps of 0.5 μm, as illustrated in FIG. 6.

Alternatively, instead of using an SVM, another type of machine learning algorithm, such as an artificial neural network, a fuzzy logic algorithm or a k-nearest neighbour algorithm, may be used.

The modules described above may be a software implementation, a hardware implementation, or a combination thereof, such as an ASIC ("Application Specific Integrated Circuit"). It will be appreciated by the skilled man in the art that the implementations of the modules may be different for different programming languages, different frameworks and different platforms.

The contrast features may be seen as features which, in different ways, express the amount of high frequency components in the image.

The contrast features 606 may comprise a number of functions, however, in order to make a reliable result it is desirable that they fulfill the following factors as good as possible:

Accuracy
It is advantageous if the function is expressed in such a way that a distance between a current position and the in-focus position may be determined on the basis of the function, e.g. that a maximum (or minimum) of the function coincides with an image captured in the in-focus position.

Unimodality

It is advantageous if the function has only one global maximum (or minimum).

Speed

In order to be able to use the function in real-time applications, it is advantageous if the function is fast.

Different functions may coincide with different factors. Therefore, a number of functions can be chosen as contrast features. Some of these functions may coincide fairly good with all factors, while other functions may coincide very well with one of the factors and acceptable with the other factors. In order to make a good classification in the classification module 612, it is advantageous if the sum of all contrast features fulfill the factors set forth above. It is therefore, in some embodiments, better to transfer too many contrast features than too few to the classification module 612, since, if the classification module 612 is configured accurately and trained with relevant training data, the classification module 612 may be able to estimate the relevancy of the incoming contrast features.

Focus functions based on differentiations may be described as $$F^1_{n,m,\Theta} = \int_{\_imagedata} \left( E\left( \left| \frac{\partial^n g(x,y)}{\partial x^n} \right| - \Theta \right) \right)^m dxdy,$$

where g(x,y) is the intensity level at (x,y), $\Theta$ is a threshold, and $E(z)=z$ if $z \geq 0$, and $E(z)=0$ if $z<0$. These functions measure the amount of high frequencies in the image by differentiating the image and adding the differentiated values together.

With the parameters set as $\Theta=0$, $m=2$ and $n=1$ a squared gradient function is achieved. An advantage of this function is that no threshold value is needed. Another advantage is that by squaring the derivatives a sharper peak may be achieved, which implies that the maximum of the function may be easier to find.

Focus functions based on the variance in the image data may be described as $$F_m^2 = \int_{\_imagedata} |g(x,y) - \bar{g}|^m dxdy,$$

where $\bar{g}$ is the average grey level in the image.

With $m=2$ the standard variance of the image data is achieved. This may be used as a contrast feature and/or a content feature.

Moreover, a focus function called Vollath's $F_4$, which is an autocorrelation function, may be included as a contrast feature. The Vollath's $F_4$ may be described as $$F_{voll4} = \sum_{i=1}^{M-1} \sum_{j=1}^{N} g(i,j) \cdot g(i+1,j) - \sum_{i=1}^{M-1} \sum_{j=1}^{N} g(i,j) \cdot g(i+2,j)$$

Additionally, a combination of Vollath's $F_4$ and Vollath's $F_5$ may be included as a contrast feature. A combination may described as $$F_{mix} = \sum_{i=1}^{M-1} \sum_{j=1}^{N} g(i,j) \cdot g(i+1,j) - \frac{19}{20} \sum_{i=1}^{M-1} \sum_{j=1}^{N} g(i,j) \cdot g(i+2,j) - \frac{1}{20} \bar{g}^2 \sum_{i=1}^{M} \sum_{j=1}^{N} 1$$

Further, a wavelet function may be used a contrast feature. An example of a wavelet function is achieved by sub-sampling the image data to a number of sub-sampled images, e.g. four sub-sampled images referred to as LL1, HL1, LH1 and HH1, wherein the HL1, LH1 and HH1 comprises the differences and LL1 comprises a compressed version of the image data, and in a next step, LL1 may be sub-sampled into double-sub-sampled images, e.g. the LL1 image is sub-sampled into four double-sub-sampled images referred to as LL2, HL2, LH2 and HH2, wherein the HL2, LH2 and HH2 comprises the differences and LL2 is a compressed version of LL1. Then, high frequency components are identified in one of the sub-sampled images and a high frequency measure is determined, e.g. by identifying a number of pixels in the HL2 image with high intensity, removing pixels with very high intensity in order to reduce the impact of noise, adding together the remaining number of high intensity pixels into a high intensity measure and normalizing the high intensity measure by dividing the high intensity measure with the mean intensity of the LL2 image.

The contrast features may further comprise a Laplace-based focus measure, i.e. a focus measure based on a convolution with a Laplace-like kernel. In one embodiment this focus measure may be implemented as a two dimensional convolution. In another embodiment this focus measure may be implemented as the square sum of two one dimensional convolutions, e.g. $F_{X_{n,c}}(R) + F_{Y_{n,c}}(R)$, where $$F_{X_{n,c}}(R) = \sum_{(x,y) \in R} (2I_c(x,y) - I_c(x-n,y) - I_c(x+n,y))^2$$

$$F_{Y_{n,c}}(R) = \sum_{(x,y) \in R} (2I_c(x,y) - I_c(x,y-n) - I_c(x,y+n))^2$$

Here $I_c(x,y)$ is the intensity of color layer c evaluated at point (x,y), R is a subset of image points, and $n \geq 0$ is a parameter controlling the number of zeros in the Laplace-like kernel. It is also possible to use only one of $F_{X_{n,c}}(R)$ and $F_{Y_{n,c}}(R)$ as a contrast feature.

Further, the convolution may be limited to be made only for pixel values greater than a pre-determined threshold.

Thanks to the RBC mask, the WBC mask and the background mask received from the segmentation module 602, the contrast features described above may be also be determined for specific regions of the image data. If there are clear differences between different regions of the image data, this type of contrast feature may improve the result of the classification module 612.

In order to determine whether the vision inspection system is positively or negatively defocused a sub-set of directional features may be determined.

Figure 7:
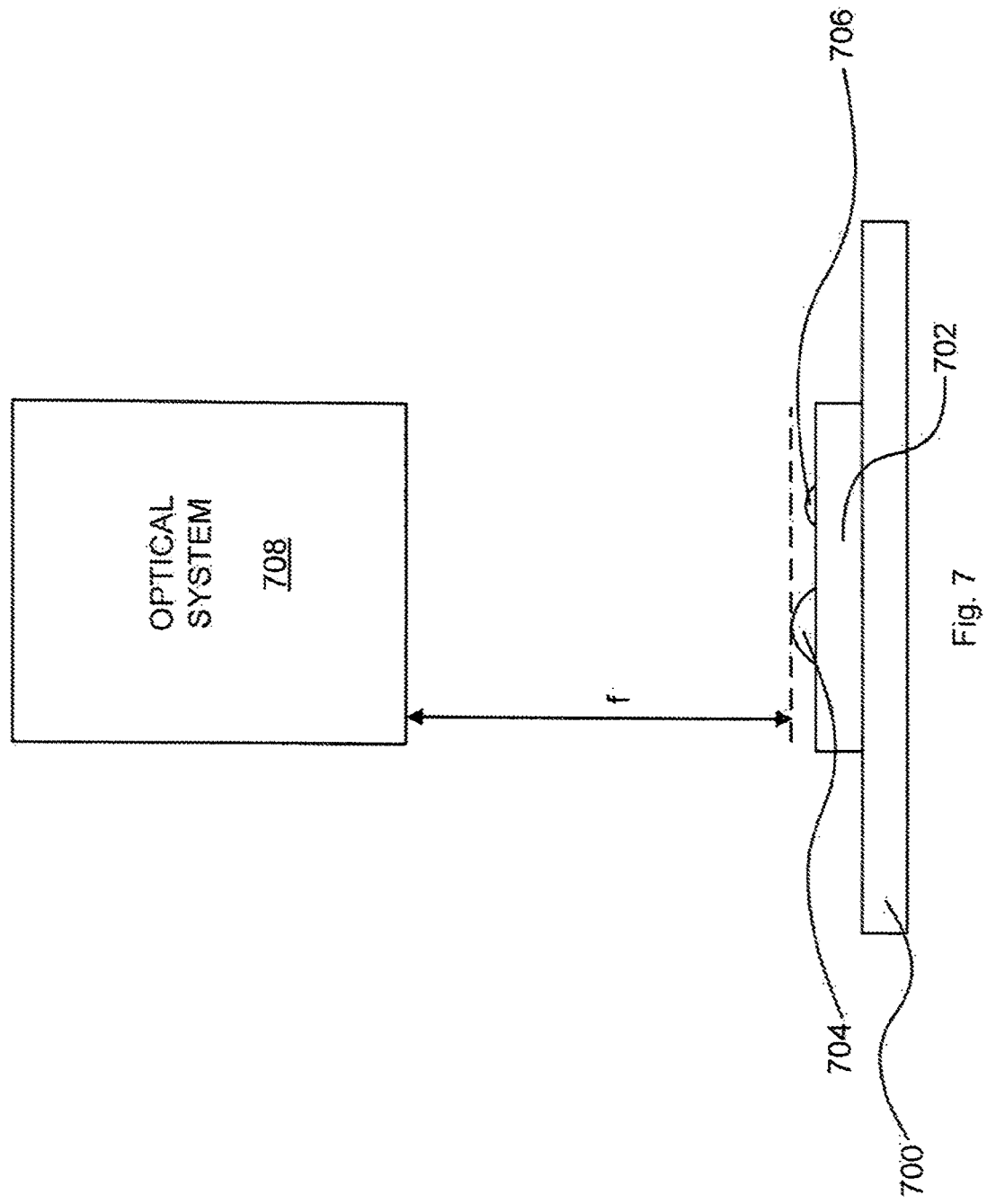
FIG. 7 illustrates an example of a situation where a large type of object in a sample is in an in-focus position at the same time as a small type of object in the sample is not in an in-focus position.

Since the objects comprised in the sample may differ in size, a large type of object, such as a WBC, may be focused, although a smaller type of object, such as a RBC, is not in focus. This phenomena is generally illustrated in FIG. 7, wherein a slide holder 700 holding a slide 702 comprising a sample, which, in turn, comprises a large type of object 704 and a small type of object 706. The distance between an optical system 708 of a vision inspection system (not illustrated) and the large type of object 704 may be equal, or close, to a focal distance f, at the same time as the distance between the small type of object 706 and the optical system 708 is not equal, or close, to the focal distance f. This implies that a standard deviation of the pixel intensities of the regions of the image data comprising large type of objects may be higher than the regions of the image data comprising small type of objects. Hence, differences in standard deviations for different regions of the image data may be used as directional features.

Further, since different colors have different wavelengths, the different color layers may have different focal distances. By determining the standard deviation for each color layer, a difference may be detected, and based on this difference an indication of whether the system is positively or negatively defocused may be achieved. Therefore, standard deviation differences for different color layers may be used as directional features. The standard deviation differences in different color layers may be determined for the whole image data or for specific regions of the image data, such as regions of the image data comprising large type objects and/or regions comprising small type objects.

The standard deviation may be described as $$STD = \sqrt{\sum_{(x,y) \in R} (I_c(x,y) - \hat{I}_c(R))^2}$$

where $I_c(x,y)$ is the intensity of the color layer c evaluated at point (x,y), R is a sub-set of image points, and $\hat{I}_c(R)$ is the mean intensity of color layer c over the image points in R.

Another directional feature may be determined by forming quotients between different Laplace-like convolutions, varying the number of zeros of the kernel and using several layers:

$$\frac{F_{A_{m,c1}}(R) \cdot F_{A_{q,c2}}(R)}{F_{A_{n,c1}}(R) \cdot F_{A_{p,c2}}(R)}$$

where A denotes X or Y, i.e. $F_A$ is one of the functions $F_X$ and $F_Y$ used in the definition of the Laplace-based focus measure, m>n, p>q, c1 and c2 denote two different color layers, and R is a sub-set of image points. R may correspond to a mask from the segmentation module.

An example of a directional feature according to the description above may be $$\frac{F_{X_{30,g}}(\tilde{R}) \cdot F_{X_{20,b}}(\tilde{R})}{F_{X_{20,g}}(\tilde{R}) \cdot F_{X_{32,b}}(\tilde{R})}$$

where g denotes the green color layer, b denotes the blue color layer, and $\tilde{R}$ is the intersection of every second column and every fourth row of R.

The content features may be seen as features that, in different ways, express the content of the image data. For instance, if a great number of blood cells are present the amount of high frequency components will be higher than in a situation where a small number of blood cells are present. The main purpose of the content features is to compensate for variations in the image that do not influence the degree/level of focus, but still influence the contrast features and directional features.

The content features may comprise a mean intensity for the whole image data, mean intensity for the background, mean intensity for the RBCs, mean intensity for the WBCs, image standard deviation for the whole image data, image standard deviation for the RBCs, image standard deviation for the WBCs, number of pixels occupied by RBCs, number of pixels occupied by WBCs, number of RBCs and/or the number of WBCs.

Contrast features, directional features and/or content features may be determined for a sub-set of the image data by utilizing the masks generated by the segmentation module.

Further, contrast features, directional features and/or content features may be determined for one specific color layer or a combination of several color layers.

Moreover, contrast features, directional features and/or content features may be determined for a sub-set of the image data for one specific color layer or a combination of several color layers.

Figure 8:
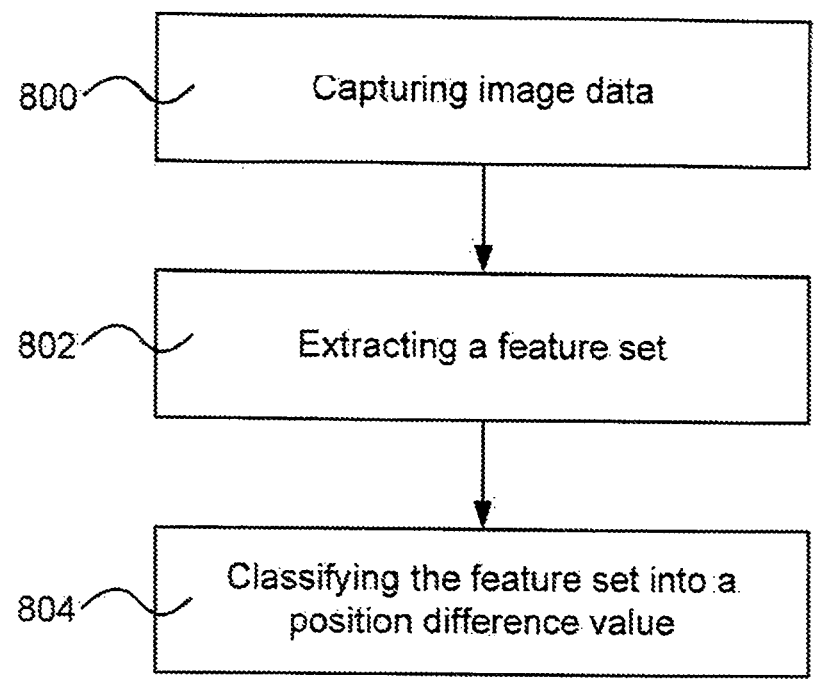
FIG. 8 illustrates a method for determining a difference between a sample position and an in-focus position.

FIG. 8 illustrates a method for determining a difference between a sample position and an in-focus position.

In a first step 800, image data depicting a sample is captured.

In a second step 802, a feature set is extracted from the image data.

In a third step 804, the feature set is classified into a position difference value, wherein the position difference value corresponds to the difference.

Figure 9:
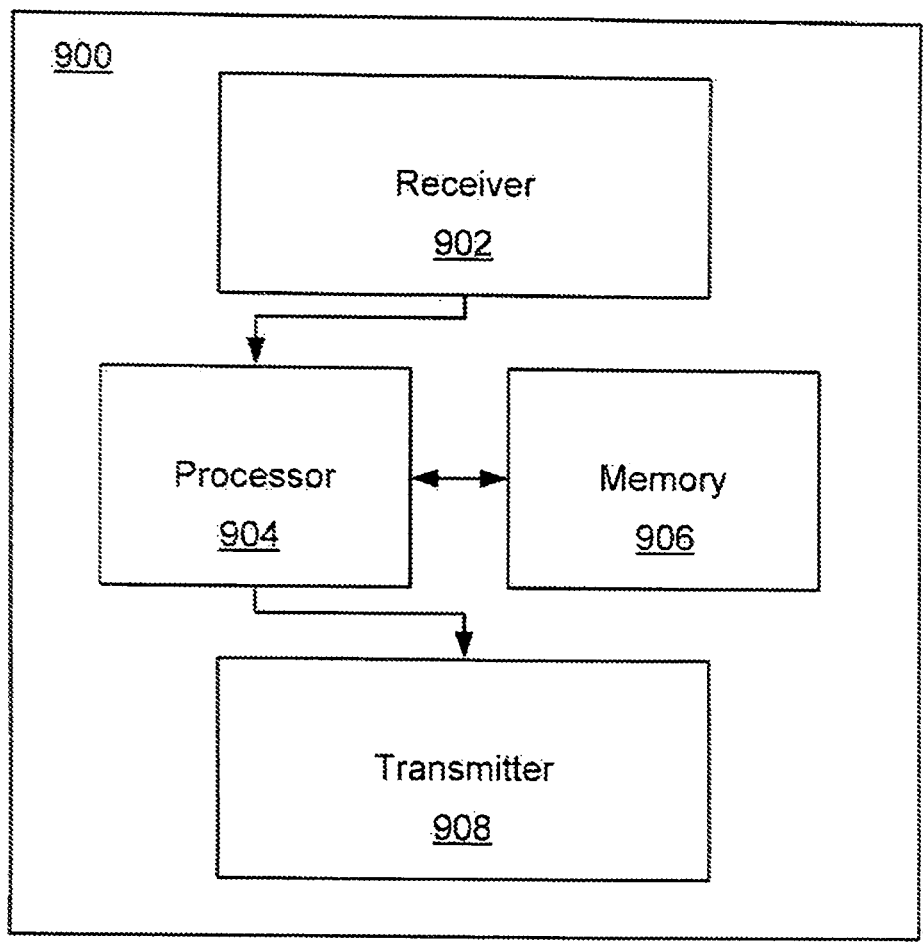
FIG. 9 illustrates a control device adapted to determine a difference between a sample position and an in-focus position.

FIG. 9 illustrates a control device 900 configured to determine a difference between a sample position and an in-focus position. The control device 900 can comprise a receiver 902 arranged to receive image data from an image capturing device. The received image data is transferred to a processor 904, which in association with a memory 906, can be adapted to extract a feature set from the image data, and to classify the feature set into a position difference value, wherein said position difference value corresponds to the difference. Further, the control device can comprise a transmitter 908 adapted to transfer the position difference value to, e.g. a steering motor system.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining a difference between a sample position and an in-focus position based on a single image, said method comprising:
    capturing image data for the single image, the image data depicting a sample when in said sample position;
    determining foreground segments and background segments in said image data;
    segmenting said foreground segments into segments of object classes, at least one of said object classes selected from a group including a red blood cell (RBC) object class and a white blood cell (WBC) object class;
    extracting a feature set from said image data, said feature set including a plurality of contrast features, the plurality of contrast features being generated using at least a wavelet function based on said image data and a Vollath's F4 function, which is an auto-correlation function, based on said image data;
    providing the feature set including the plurality of contrast features as input to a machine learning algorithm that is trained to associate feature sets including pluralities of contrast features with respective position difference values; and
    using the machine learning algorithm to classify said feature set including the plurality of contrast features into a single position difference value corresponding to said difference between the sample position and the in-focus position; wherein said feature set further includes a sub-set of content features, said sub-set of content features including overall content features and segmental content features, and said segmental content features are selected from a group including a mean intensity for the foreground segments, a mean intensity for the background segments, a variance for the foreground segments, a variance for the background segments and an area function expressing an area distribution between different segments.

2. The method according to claim 1, wherein said plurality of contrast features are determined for a plurality of color layers.

3. The method according to claim 1, wherein said plurality of contrast features are determined for a sub-set of said image data.

4. The method according to claim 1, wherein said feature set further includes a sub-set of directional features.

5. The method according to claim 4, wherein a number of features of said sub-set of directional features are determined by identifying differences between a plurality of color layers, and determining at least one feature value based upon said differences.

6. The method according to claim 4, wherein a number of features of said sub-set of directional features are determined by identifying a number of different objects having different heights in said sample, determining differences for said different objects, and determining at least one feature value based upon said differences for said different objects.

7. The method according to claim 4, wherein said sub-set of directional features includes a quotient between different Laplace-based focus measures according to the formula $$\frac{F_{A_{m,c1}}(R) \cdot F_{A_{q,c2}}(R)}{F_{A_{n,c1}}(R) \cdot F_{A_{p,c2}}(R)}.$$

8. The method according to claim 4, wherein said sub-set of directional features are determined for a sub-set of said image data.

9. The method according to claim 1, wherein said overall content features are selected from a group including a mean intensity for the whole image data and a variance for the whole image data.

10. The method according to claim 1, wherein said overall content features are determined for a plurality of color layers.

11. The method according to claim 1, wherein said foreground segments and said background segments are determined for a plurality of color layers.

12. The method according to claim 1, further comprising: determining a number of objects in an object class among the at least one of said object classes.

13. The method according to claim 1, further comprising: determining a number of pixels belonging to objects of an object class for at least one of said object classes.

14. The method according to claim 1, wherein said feature set is classified into the single position difference value by a support vector machine.

15. A non-transitory computer-readable medium storing a computer program comprising software instructions arranged to perform the method according to claim 1 when downloaded and run on an apparatus.

16. The method of claim 1, further comprising: adjusting said sample position of the sample based on the single position difference value.

17. The method of claim 1, further comprising: altering a distance between said sample and an optical system based on the single position difference value.

18. A vision inspection system comprising:

a slide holder adapted to hold at least one slide including a sample;

an image capturing device configured to capture image data depicting said sample when in a sample position, wherein said image capturing device includes an optical system and an image sensor;

a steering motor system configured to alter a distance between said sample and said optical system; and a processor connected to said image capturing device and said steering motor system;

wherein said processor, in association with a memory, is configured to determine a difference between said sample position and an in-focus position based on a single image by receiving said image data depicting said sample from said image capturing device, determining foreground segments and background segments in said image data, segmenting said foreground segments into segments of object classes, at least one of said object classes selected from a group including a red blood cell (RBC) object class and a white blood cell (WBC) object class, extracting a feature set from said image data, said feature set including a plurality of contrast features, the plurality of contrast features being generated using at least a wavelet function based on said image data and a Vollath's F4 function, which is an auto-correlation function, based on said image data, providing the feature set including the plurality of contrast features as input to a machine learning algorithm that is trained to associate features sets including pluralities of contrast features with respective position difference values, and using the machine learning algorithm to classify said feature set including the plurality of contrast features into a single position difference value corresponding to said difference between the sample position and the in-focus position;

wherein said feature set further includes a sub-set of content features, said sub-set of content features including overall content features and segmental content features; and wherein said segmental content features are selected from a group including a mean intensity for the foreground segments, a mean intensity for the background segments, a variance for the foreground segments, a variance for the background segments and an area function expressing an area distribution between different segments.

19. The vision inspection system according to claim 18, wherein said feature set further includes a sub-set of directional features.

20. The vision inspection system according to claim 19, wherein a number of features of said sub-set of directional features are determined by
   identifying differences between a plurality of color layers, and
   determining at least one feature value based upon said differences.

21. The vision inspection system according to claim 19, wherein said sub-set of directional features includes a quotient between different Laplace-based focus measures according to the formula $$\frac{F_{A_{m,c1}}(R) \cdot F_{A_{q,c2}}(R)}{F_{A_{n,c1}}(R) \cdot F_{A_{p,c2}}(R)}.$$

22. The vision inspection system according to claim 18, wherein said feature set is determined for a plurality of color layers.

23. The vision inspection system according to claim 18, wherein said feature set is determined for a sub-set of said image data.

24. The vision inspection system according to claim 18, wherein said feature set is classified into the single position difference value by a support vector machine.

25. The vision inspection system of claim 18, wherein the steering motor system is further configured to alter the distance between said sample and said optical system based on the single position difference value.

26. A control device comprising:
   a receiver configured to receive image data depicting a sample when in a sample position,
   a processor, in association with a memory, configured to determine a difference between said sample position and an in-focus position based on a single image by
      determining foreground segments and background segments in said image data,
      segmenting said foreground segments into segments of object classes, at least one of said object classes selected from a group including a red blood cell (RBC) object class and a white blood cell (WBC) object class,
      extracting a feature set from said image data, said feature set including a plurality of contrast feature values, the plurality of contrast feature values including at least a wavelet function based on said image data and a Vollath's F4 function, which is an autocorrelation function, based on said image data,
      providing the feature set including the plurality of contrast feature values as input to a machine learning algorithm that is trained to associate feature sets including pluralities of contrast feature values with respective position difference values, and
      using the machine learning algorithm to classify said feature set including the plurality of contrast feature values into a single position difference value corresponding to said difference between the sample position and the in-focus position; and
   a transmitter configured to transmit said difference;
   wherein
      said feature set further includes a sub-set of content features, said sub-set of content features including overall content features and segmental content features, and
      said segmental content features are selected from a group including a mean intensity for the foreground segments, a mean intensity for the background segments, a variance for the foreground segments, a variance for the background segments and an area function expressing an area distribution between different segments.

27. The control device of claim 26, wherein the transmitter is further configured to transmit said difference to adjust the sample position of said sample based on the single position difference value.

* * * * *

UNITED STATES PATENT AND TRADEMARK OFFICE
CERTIFICATE OF CORRECTION

PATENT NO. : 10,210,376 B2
APPLICATION NO. : 12/449873
DATED : February 19, 2019
INVENTOR(S) : Sven Hedlund et al.

Page 1 of 1

It is certified that error appears in the above-identified patent and that said Letters Patent is hereby corrected as shown below:

On the Title Page

At item (86):
"PCT No.: PCT/JP2008/051993" should read --PCT No.: PCT/EP2008/051993--

Signed and Sealed this
Seventh Day of May, 2019

Andrei Iancu
*Director of the United States Patent and Trademark Office*